United States Patent Office 3,217,050
Patented Nov. 9, 1965

---

3,217,050
ALKALI METAL CATALYZED CONVERSION OF ORGANIC COMPOUNDS
Alan Schriesheim, Berkeley Heights, N.J., and Charles A. Rowe, Jr., Brooklyn, N.Y., assignors to Esso Research and Engineering Company, a corporation of Delaware
No Drawing. Filed June 7, 1961, Ser. No. 115,302
7 Claims. (Cl. 260—668)

This invention concerns a new and improved means of dissolving alkali metals and uses for the resulting solutions. More specifically, the instant invention concerns the preparation of a catalyst which has outstanding properties useful in organic conversion reactions.

It has long been a problem in the chemical and petroleum industries to carry out certain reactions, such as isomerization and alkylation, by means of an anion-radical mechanism. While some success has been recently achieved, the rates of reaction, particularly in those cases where the reactants have a weakly ionizable carbon to hydrogen bond, have not been entirely satisfactory.

In accordance with this invention, it has been found that alkali metal can be added to certain solvents, thereby producing a catalyst which greatly increases the rate of reaction in conversion processes which proceed by the anion-radical mechanism. The particular solvents employed may be broadly defined as having the following properties:

(1) Aprotic
(2) A high dielectric constant in excess of 15 at 25° C.
(3) Dipolar
(4) Nonhydroxylic
(5) The dipolar group must be hydrogen free
(6) The atoms adjacent to the dipolar group must be hydrogen free.

These solvents include organic compounds having the following dipolar groups:

(1) Phosphoryl, a trivalent PO radical
(2) Carbonyl, a divalent CO radical
(3) Sulfinyl or sulfoxide, the divalent SO radical
(4) Sulfonyl or sulfone, the bivalent $SO_2$ radical
(5) Thiocarbonyl, the divalent CS radical.

Examples of the carbonyl type include tetraalkyl substituted ureas such as tetramethyl urea and substituted acetamides such as t-butyl N,N-dimethyl formamide. The sulfinyl radical compounds include tetraalkyl substituted sulfonamides such as tetramethyl sulfonamide and bis-dialkyl amino sulfoxide. An example of the sulfones is tetramethylene sulfone and an example of compounds having a thiocarbonyl group is alkyl substituted thioureas such as tetramethyl thiourea.

Most preferred are the compounds having a phosphoryl radical. These compounds may be defined generically by the formula:

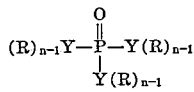

wherein Y is oxygen, nitrogen or sulfur; R is an alkyl or aryl radical; and $n$ is the valence of Y. Many compounds within the above generic definition are well known. When Y is nitrogen, oxygen and sulfur, respectively, the class of compounds may be described as phosphoramides, normal phosphates and trithiophosphene oxides, respectively. Hexasubstituted phosphoramides, such as hexamethylphosphoramide $[(CH_3)_2N]_3P=O$, are an example of the phosphoramides. Also, trimethylphosphate $(CH_3O)_3P=O$, is an example of the normal phosphates and tris(methyl mercapto)phosphate oxide, $(CH_3S)_3P=O$, is an example of the trithiophosphene oxides. It is preferred that Y be nitrogen, that is, the phosphoramides. As to R, it is preferable that it be selected from an alkyl or aryl group so that the resultant compound is a liquid. For example, when R is an alkyl group, it is preferred that it have from 1 to 6 carbon atoms per radical.

The alkali metal employed in the instant invention may be any of the monovalent elements of the first group of the periodic system. These include lithium, sodium, potassium, rubidium and cesium. In the application of the invention, it has been found that the activity of the metals, when added to the above solvents, is inversely related to atomic weight, i.e. the lighter metals are most active.

The solubility of the alkali metals in 100 cc. hexamethylphosphoramide at room temperature is shown in the following table:

TABLE I

| Alkali metal: | Grams at saturation |
|---|---|
| Li | 1.7 |
| Na | 1.2 |
| K | 3.0 |
| RB | >0.1 |

The amount of alkali metal which is dissolved in the solvent of this invention may vary over a broad range. Generally, it is preferable to use a solution saturated at room temperature; however, this is largely a practical consideration, since even a trace amount of alkali metal will serve to catalyze many reactions.

A wide variety of reactions is contemplated herein. Broadly, almost any organic compound can be reacted which has an acidic hydrogen (attached to a carbon atom) which may be removed to form the carbanion intermediate. Reactions which require the presence of oxygen or other material which is detrimental to the alkali metal or solvent must be avoided. Examples of reactions readily catalyzed by the alkali metal-solvent system include:

(a) Double bond isomerization of olefins
(b) Alkylation of alkyl aromatics with olefins, ketones and organic halides
(c) Homogeneous hydrogenation of olefins, diolefins and aromatics
(d) Polymerization of activated olefins and diolefins, including dimerization, trimerization, etc.
(e) benzyne formation from known precursors, e.g. α-fluorobromobenzene
(f) Carbene generation from halogen-substituted compounds, ethers, sulfides, ammonia salts, etc.
(g) Silene generation In addition, since these systems facilitate ionic reactions, reactions involving organometallic compounds will be enhanced. An example of an organometallic reaction contemplated therein is the reaction of benzyl halides with the alkaline earth metal to form benzyl alkali metals. This latter compound may then be reacted with a variety of compounds such as ketones and aldehydes. More specifically, when benzyl chloride is reacted with sodium, benzyl sodium is formed. This latter compound may be reacted with acetone to form dimethyl benzyl carbinol. It should be noted that in these reactions the dissolved sodium is one of the reacted constituents consumed by the reaction.

The above-recited reactions may be performed either heterogeneously or homogeneously according to considerations well known in the art. Most generally, when liquid reactants are employed and they are miscible with the solvent system, the materials are stirred together and a homogeneous reaction is carried out. This procedure would be used in polymerization, isomerization, carbene generation, etc. reactions.

If the liquid reactant is immiscible with the solvent system, a two-phase liquid reaction is carried out as, for example, in isomerization when an excess of olefin is used.

If the reactants are in the gaseous phase, they may be bubbled through the solvent system. Heterogeneous reactions of this type are exemplified by isomerization of hydrocarbons. Under certain circumstances, it may be desirable to employ only a small quantity of the solvent system, as for example, in polymerization a few drops of the solvent may be added to the liquid reactants.

The temperatures employed for carrying out the above reactions are governed by practical considerations. In the case of hexamethylphosphoramide, an upper limit of about 300° C. would be desired since, above this temperature, the system may decompose. Similarly, the lower limit is governed by the freezing point of the solvent and the reactants. A practical temperature would be one in which the rate of reaction is at least 0.1 w./hr./w. These rate considerations must also be used in ascertaining the amount of alkali metal to reactants employed for the particular reaction.

While the terms "solvent system," "solvent," "dissolve" and "saturated solution" are employed throughout the specification, it is to be understood that the exact physical and chemical phenomenon which takes place upon adding the alkali metal to the solvent may not be wholly in accordance with the conventional use of such terminology.

While the fundamental nature of the alkali metal phosphoramide solutions is not experimentally known, the following speculations are apparent. The phosphorus in the P=O bond may accept an electron in its d-orbitol. Thus, with easily ioinzable materials such as the alkali metals, a situation may arise where the alkali metal ionizes and the electron is effectually "solvated" by the solvent. Preliminary electron spin resonance studies show that this may be happening. The metal cation, in turn, may be solvated by bonding to the oxygen function.

The following examples will further illustrate the instant invention:

Example 1

The following experiment was performed to show the advantage of the system of the instant invention as compared to catalyst systems hitherto used. Lithium, sodium, potassium, and rubidium were dissolved in hexamethylphosphoramide. 0.081 mol of 2-methylpentene-1 was introduced into 100 cc. of the solution at 93.5° F. at one atmosphere pressure. The olefin concentration was 0.736 molar. The rates of reaction are shown in the table below. To show that the alkali metals are efficacious only in the solvents of the invention, they are also introduced into dimethylsulfoxide and t-butyl alcohol. In addition, the results obtained with the alkali metal catalyst as compared to potassium t-butoxide are shown.

TABLE IA

| Catalyst | Conc. molarity | Temp., °F. | Rate of conversion ($k_{min}^{-1} \times 10^3$) | | |
|---|---|---|---|---|---|
| | | | Hexamethylphosphoramide | Dimethylsulfoxide | t-Butanol |
| Li* | 2.5 | 93.5 | 5,900 | Decom. | Decom. |
| Na* | .178 | 93.5 | ≈5,900 | Decom. | Decom. |
| K | .430 | 93.5 | 24 | Decom. | Decom. |
| Rb | .0069 | 93.5 | 10 | Decom. | Decom. |
| KotBu | 1.42 | 131 | | 5.4 | 0. |
| KotBu | 0.48 | 131 | 1.7 | 5.4 | |

*Cis and trans 4-methylpentene-2 and 4-methylpentene-1 appeared in relatively large conversions.

The above results show that the rates of conversion with the alkali metal solvent system of the invention are much greater than those shown with the use of potassium t-butoxide. It should be especially noted that outstanding results are obtained where the lighter alkali metals are employed, i.e. lithium and sodium. Both the dimethylsulfoxide and t-butyl alcohol decomposed upon the introduction of the alkali metal.

Example 2

In this example, 2.5 cc. of 2-methylpentene-1 were introduced into solvents containing 0.5 g. of sodium at temperatures of 55° C. for two hours. The effect of the solvent system is shown in the following data. In the first run, 25 cc. of hexamethylphosphoramide were employed; in the second run, 50 cc. of hexamethylphosphoramide; and in the third run, 25 cc. of hexamethylphosphoramide and 250 cc. of tetrahydrofuran.

TABLE II.—ISOMERIZATION OF OLEFIN

| Solvent, cc. | | 2-methyl pentene-1 | 2-methyl pentene-2 | Trans-4-methyl pentene-2 | Cis-4-methyl pentene-2 | 4-methyl pentene-1 |
|---|---|---|---|---|---|---|
| Hexamethylphosphoramide | Tetrahydrofuran | | | | | |
| 25 | 0 | 8.93 | 82.41 | 7.04 | 1.43 | 0.29 |
| 50 | 0 | 9.15 | 77.84 | 10.94 | 1.71 | 0.31 |
| 25 | 250 | 29.68 | 62.17 | 7.04 | 0.97 | 0.20 |

The above data show the mol percent of 2-methylpentene-1 formed and various reaction products at the end of two runs. By increasing the amount of hexamethylphosphoramide, only slight change in the reaction produce is noted. Upon the addition of the tetrahydrofuran, it is noted that the reaction proceeds, but at a slower rate. The tetrahydrofuran, which would be ineffective if used alone, merely serves as a diluent.

Example 3

The following data show the ethylation of toluene with the solvent system of the instant invention. In Table III, lithium is employed as the catalyst; and in Table IV, sodium is used. Table V shows comparative data with a catalyst other than the alkali metal of the instant invention, specifically potassium t-butoxide.

TABLE III.—ETHYLATION OF TOLUENE

Temperature _____ 76° F.
Solvent _____ 350 ml. hexamethylphosphoramide.
Charge _____ 50 ml. toluene.
Catalyst _____ 1.7 g. lithium.
Pressure _____ Ethylene, 450–500 p.s.i.

| Time, min. | Toluene (mol percent) | n-propyl benzene (mol percent) |
|---|---|---|
| Feed | 99.81 | .08 |
| 3 | 99.39 | .52 |
| 6 | 86.42 | 10.27 |
| 9 | 75.61 | 17.28 |
| 15 | 51.49 | 20.01 |
| 21 | 46.81 | 20.22 |
| 27 | 35.41 | 17.53 |
| 33 | 32.78 | 16.97 |
| 39 | 28.51 | 17.05 |
| 45 | 23.58 | 16.55 |
| 60 | 24.67 | 14.86 |
| 90 | 23.94 | 13.29 |
| 120 | 19.31 | 15.73 |

TABLE IV

Solvent _____ 150 cc. hexamethylphosphoramide.
Charge _____ 50 mm. toluene.
Catalyst _____ 5 g. sodium.
Pressure _____ Ethylene, 500–600 p.s.i.

| Run No. | Time | Temp., °F. | Toluene (mol percent) | n-propyl benzene (mol percent) |
|---|---|---|---|---|
| 1 | 5 min. | 76 | 88.07 | 5.74 |
| 2 | 2 hrs. | 302 | 2.9 | 12.4 |
| 3 | 6.5 hrs. | 302 | 3.88 | 10.17 |
| 4 | 24 hrs. | 302 | 2.8 | 11.2 |

1, 3—Analysis by gas chromatography.
2, 4—Analysis by mass spectrophotometry.

TABLE V.—TOLUENE ETHYLATION

Hexamethylphosphoramide, cc _____ 300    400
Toluene, cc _____ 53     43
Potassium t-butoxide, gm _____ 16.8   56

| Run No. | 1 | 2 | 3 | 4 | 5 | 1 | 2 | 3 | 4 | 5 | 6 |
|---|---|---|---|---|---|---|---|---|---|---|---|
| Time, hrs. | 0.1 | 0.5 | 1.5 | 19 | 24 | .2 | 2 | 19 | 23 | 43 | 46 |
| Temperature, °F. | 76 | 302 | 302 | 302 | 302 | 76 | 304 | 298 | 400 | 440 | 440 |
| Pressure, p.s.i. | 275 | 565 | 565 | 675 | 825 | 300 | 740 | 740 | 900 | 950 | 950 |
| Products: | | | | | | | | | | | |
| Toluene | | | | 99.43 | 99.3 | | | 99.61 | | | 99.00 |
| Propyl benzene | Trace | Trace | Trace | 0.56 | .65 | Trace | Trace | 0.38 | | | 0.66 |

The above tables show that where lithium and sodium are used as catalysts in hexamethylphosphoramide, rapid rates of conversion to normal propyl benzene are obtained. On the other hand, where potassium t-butoxide is dissolved in hexamethylphosphoramide, the conversion is extremely slight. Note, for example, that neither increasing the pressure nor the temperature served to significantly increase the rate of conversion. In addition, it should be noted that increasing the potassium t-butoxide concentration from 16.8 g. in 300 cc. to 56 g. in 400 cc. did not significantly affect the reaction rate.

Example 4

The following two runs were performed to show the dimerization of ethylene by using a sodium-hexamethylphosphoramide system. In Table VI below, three product analyses were performed. In Run No. 62, the product was analyzed before the addition of water to the liquid product. In Run No. 72 the analysis was performed both before and after methanol was added to the liquid mixture.

TABLE VI.—ETHYLENE DIMERIZATION

| Run No. | 62 | 72 | |
|---|---|---|---|
| Solvent | 200 cc. HMPA | 200 cc. HMPA. | |
| Temperature, °F. | 300–320 | 60–75. | |
| Pressure | 600–700 p.s.i. | 300–450 p.s.i. | |
| Time | 21 hours | 4 hours. | |
| Catalyst | 5 gm. sodium (.23 M) | 3 gm. sodium (.13 M). | |
| | | 1 | 2 |
| Products, gas., mol percent: | | | |
| $H_2$ | 0.12 | 0.31 | 11.78 |
| $CH_4$ | 0 | 0 | 1.02 |
| Ethane | 0.34 | 0 | 18.94 |
| Ethylene | 80.88 | 99.16 | 55.21 |
| Butane | 14.77 | 0.47 | 9.76 |
| Butene | 0 | 0.02 | 0.63 |
| Pentene | 0.42 | 0.01 | 0 |
| Pentane | 3.14 | 0.02 | 2.02 |
| Moles collected, gas | 1.4 | 1.2 | .05 |
| Insoluble material | Trace G.C. $C_6$, $C_8$, $C_{10}$, $C_{12}$ present | | |

Run No. 62—Products before adding $H_2O$ to liquid product.
Run No. 72-2—Products after adding $CH_3OH$ to liquid mixture formed alkyl metal compound.

The above table shows that a significant portion of the ethylene was dimerized to butane. This became particularly apparent upon the addition of methanol in Run No. 72.

Example 5

In the following experiment, butadiene was polymerized in the presence of lithium and sodium, respectively, dissolved in hexamethylphosphoramide. For comparison purposes, the same reaction was carried out in the presence of potassium t-butoxide dissolved in dimethylsulfoxide. n-Pentane was added in the first run and acts merely as an inert solvent within which the reaction can proceed.

TABLE VII.—POLYMERIZATION OF BUTADIENE

| Time, hrs. | Temperature, °F. | Pressure, atm. | Catalyst | Grams | Dimethylsulfoxide, cc. | Hexamethylphosphoramide, cc. | n-Pentane, cc. | Butadiene, cc. | Polybutadiene product, gm. | Experiment No. |
|---|---|---|---|---|---|---|---|---|---|---|
| 24 | 0–10 | 1 | Li | 0.4 | | 20 | 400 | 200 | 170 | 1179–75 |
| | 212 | 20 | Na | 2 | | 350 | | 86 | 55 | 1179–66 |
| | 212 | 20 | KotBu | | 100 | | | 300 | 0 | 1179–65 |

The above data show that satisfactory polymerization of the butadiene was obtained in using the system of the instant invention, better results being obtained with the lithium catalyst. In comparison, the potassium t-butoxide-dimethylsulfoxide system resulted in no polymerization.

*Example 6*

That the instant alkali metal solution enhances ionic organometallic reactions is shown by the following data. Two runs were performed using potassium dissolved in hexamethylphosphoramide with benzyl chloride as the feed. At the end of 12 hours, the reaction mixture was quenched with water and subjected to a gas chromatography analysis. Table VIII shows the data obtained.

TABLE VIII.—PREPARATION OF ORGANOMETALLICS

Temperature _____ 70–80° F.
Time _____ 12 hrs.
Vessel _____ Stirred glassware; $N_2$ blanket.

| 1179-78 | 1 | 2 |
|---|---|---|
| Hexamethylphosphoramide, cc | 100 | 100 |
| K, gms | 1.5 | 3.0 |
| Benzyl chloride, gm | 4.4 | 5.0 |
| Toluene, mol percent | 12 | 5.6 |

It will be noted that a substantial amount of the benzyl chloride was converted to toluene. Upon the addition of the benzyl chloride to the solvent system, benzyl potassium was formed. By quenching the reaction product with water, toluene and potassium hydroxide are produced.

*Example 7*

To show the efficacy of solvents other than hexamethylphosphoramide in the instant invention, about 0.2 g. of potassium were dissolved in 10 cc. of tetramethyl urea. Four cc. of 2-methylpentene-1 were added at room temperature. After one hour, analysis showed a 40% conversion to 2-methylpentene-2.

The above examples are merely illustrative of the instant invention and should not be taken as definitive of its scope.

What is claimed is:
1. In a double bond isomerization process wherein monoolefins containing a weakly ionizable carbon to hydrogen bond and capable of forming an anion radical is reacted to form a reaction product, the improvement which comprises forming said anion radical by contacting said olefin with a catalyst system consisting essentially of an alkali metal and a solvent having the formula:

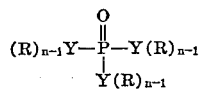

wherein Y is selected from the group consisting of oxygen, nitrogen and sulfur, R is selected from the group consisting of alkyl and aryl radicals, and $n$ is the valence of Y.

2. The process of claim 1 wherein the alkali metal is lithium and the solvent is hexa-methylphosphoramide.

3. In an alkylation reaction process wherein an alkyl aromatic compound containing a weakly ionizable carbon to hydrogen bond and capable of forming an anion radical is reacted to form a reaction product, the improvement which comprises forming said anion radical by contacting said alkyl aromatic with a catalyst system consisting essentially of an alkali metal and a solvent having the formula:

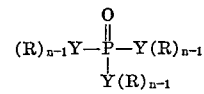

wherein Y is selected from the group consisting of oxygen, nitrogen and sulfur, R is selected from the group consisting of alkyl and aryl radicals, and $n$ is the valence of Y.

4. The process of claim 3 wherein the alkaline metal is lithium and the solvent is hexa-methylphosphoramide.

5. In a polymerization process wherein an olefin selected from the group consisting of monoolefins and diolefins containing a weakly ionizable carbon to carbon bond capable of forming an anion radical is reacted to form a reaction product, the improvement which comprises forming said anion radical by contacting said olefin with a catalyst system consisting essentially of an alkali metal and a solvent having the formula:

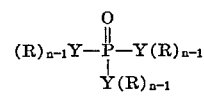

wherein Y is selected from the group consisting of oxygen, nitrogen and sulfur, R is selected from the group consisting of alkyl and aryl radicals, and $n$ is the valence of Y.

6. The process of claim 5 wherein the diolefin is butadiene.

7. The process of claim 5 wherein the alkali metal is lithium and the solvent is hexa-methylphosphoramide.

References Cited by the Examiner

UNITED STATES PATENTS

| 2,958,688 | 11/60 | Coover et al. | 260—93.7 |
| 2,973,348 | 2/61 | Coover et al. | 252—429 |
| 3,026,311 | 3/62 | Coover et al. | 260—93.7 |
| 3,053,916 | 9/62 | Wilson et al. | 260—683.15 |

OTHER REFERENCES

Hamrick et al.: J.A.C.S., volume 81 (1959), pages 493–496.

References Cited by the Applicant

"Mechanism and Structure in Organic Chemistry," by Edwin S. Gould; Holt, Rinehart and Winston, Inc., New York, 1959, pages 365 et seq.

ALPHONSO D. SULLIVAN, *Primary Examiner.*

PAUL M. COUGHLAN, *Examiner.*